(12) United States Patent
Derman

(10) Patent No.: US 9,131,676 B1
(45) Date of Patent: Sep. 15, 2015

(54) RODENT TRAP IMPROVEMENT

(71) Applicant: Jay S Derman, Temecula, CA (US)

(72) Inventor: Jay S Derman, Temecula, CA (US)

( * ) Notice: Subject to any disclaimer, the term of this patent is extended or adjusted under 35 U.S.C. 154(b) by 0 days.

(21) Appl. No.: 14/675,584

(22) Filed: Mar. 31, 2015

(51) Int. Cl.
*A01M 23/30* (2006.01)
*A01M 23/24* (2006.01)

(52) U.S. Cl.
CPC .............. *A01M 23/30* (2013.01); *A01M 23/24* (2013.01)

(58) Field of Classification Search
USPC ......................................... 43/81, 77, 81.5, 82
See application file for complete search history.

(56) References Cited

U.S. PATENT DOCUMENTS

| 611,749 | A | * | 10/1898 | Davis | 43/82 |
| 1,930,886 | A | * | 10/1933 | Scott | 43/81 |
| 2,426,973 | A | * | 9/1947 | McCrimmon | 43/81 |
| 2,640,293 | A | * | 6/1953 | Cook | 43/81 |
| 6,282,832 | B1 | * | 9/2001 | Manno | 43/81 |
| 7,162,832 | B2 | * | 1/2007 | Simpson et al. | 43/81 |
| 2003/0009928 | A1 | * | 1/2003 | Stoddard | 43/77 |

* cited by examiner

*Primary Examiner* — Christopher P Ellis
(74) *Attorney, Agent, or Firm* — Aaron P. McGushion

(57) ABSTRACT

The present improved animal trap and unique catch eliminates substantial eating or removal of the bait without the trap activating. This is accomplished by an improved catch which supports a piece of bait, and in turn, the bait blocks the movement of the holding arm bar. Only upon disturbance of the bait, will the holding arm bar be permitted to release from the catch due to the bait no longer blocking the movement of the holding arm bar. One embodiment accomplishes this action through a bait gap formed in the catch. The holding arm bar is aligned with the bait gap, such that the holding arm bar should pass through the bait gap in order for the pivoting kill bar hammer to snap closed against the top surface of the platform.

14 Claims, 3 Drawing Sheets

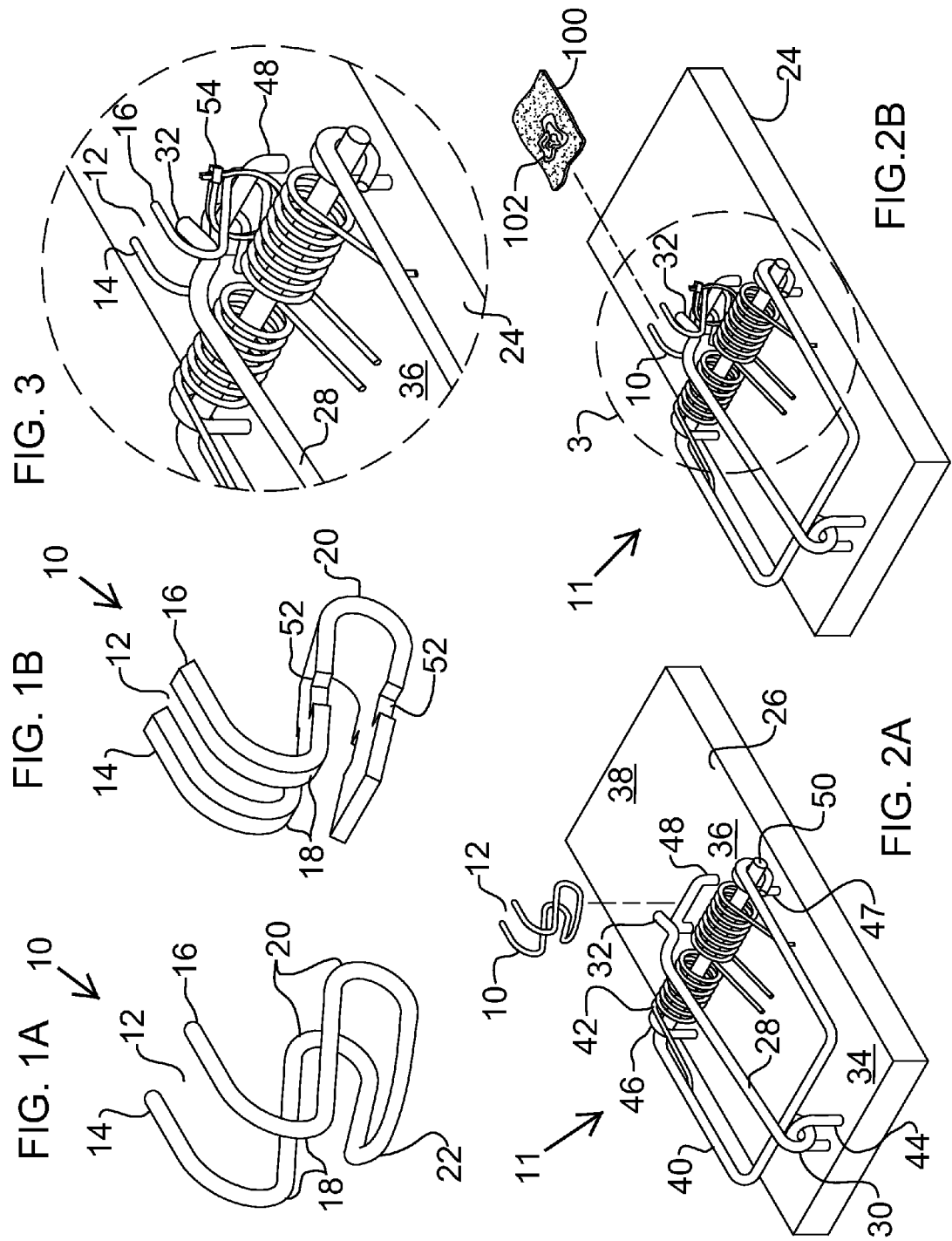

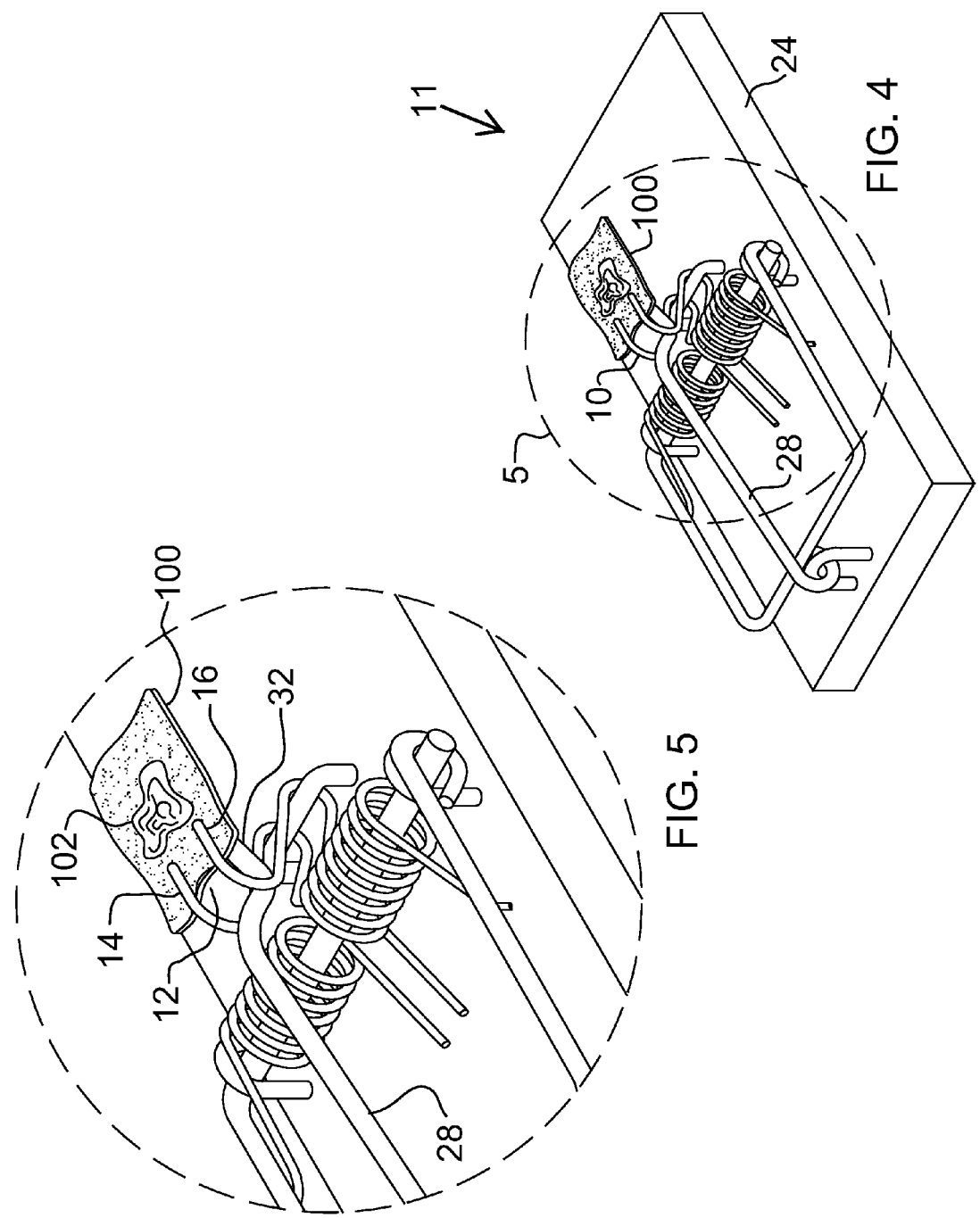

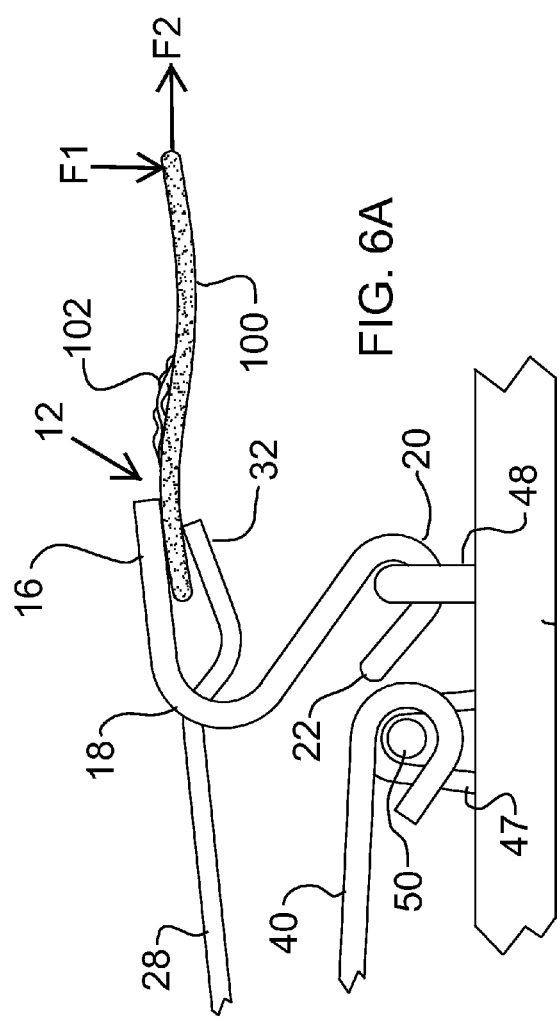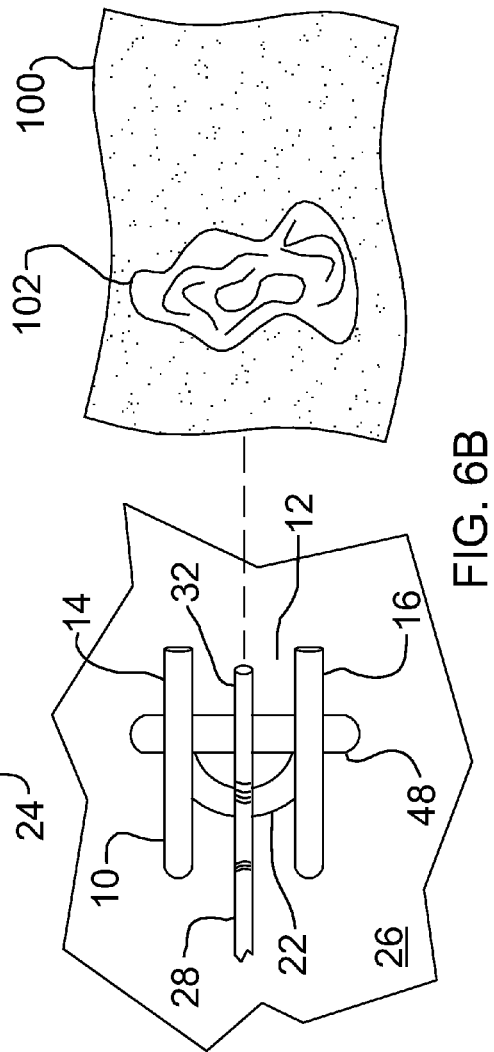

RODENT TRAP IMPROVEMENT

BACKGROUND

The field of the present device and method relates to spring-loaded animal traps, and more particularly, to baited catch for a spring-loaded animal trap, such as a mouse trap, rat trap, or the like.

With standard mouse traps, also known as snap traps or spring-loaded arm bar mouse traps, the catch serves two primary purposes, to restrain the holding arm bar when the trap is set and to hold the bait. In order for the trap to activate, the rodent must apply sufficient force to the catch through the eating of the attached bait to cause the catch to release the holding arm bar. It is too often the case that the mouse can gently eat the bait without activating the trap. Thus, when later checked, the trap may still be set, yet the catch cleaned of the bait. What is needed is an improved catch that prevents eating or removal of the bait without activation of the trap.

SUMMARY

The present improved animal trap and unique catch eliminates substantial eating or removal of the bait without the trap activating. This is accomplished by an improved catch which supports a piece of bait, and in turn, the bait blocks the movement of the holding arm bar. Only upon disturbance of the bait, will the holding arm bar be permitted to release from the catch due to the bait no longer blocking the movement of the holding arm bar. One embodiment accomplishes this action through a bait gap formed in the catch. The holding arm bar is aligned with the bait gap, such that the holding arm bar should pass through the bait gap in order for the pivoting kill bar hammer to snap closed against the top surface of the platform.

In a first embodiment, an animal trap has a catch with a bait gap, with the catch being positioned on the top surface of a platform. The platform has a top surface with a first section, a second section, and a third section located between the first section and the second section. A holding arm bar has a proximal end and a distal end, with the holding arm bar attached through a pivot to the first section of the platform by the proximal end. A pivoting kill bar hammer is attached to the third section of the platform and is spring-biased towards the second section. The pivoting kill bar hammer is pivoted towards the first section against the bias with the distal end of the holding arm bar being positioned below the bait gap and the proximal end restraining the pivoting kill bar hammer. The bait is positioned to span the bait gap and lie between the catch and the distal end of the holding arm bar to prevent travel of the distal end through the bait gap, such that the pivoting kill bar hammer is held towards the first section by the holding arm bar, the distal end being released upon dislodging of the bait from the bait gap to permit the pivoting kill bar hammer to return towards the second end.

Optionally, the catch has a first portion and a second portion with the bait gap formed between the first portion and the second portion. The first portion may be a first tine and the second portion may be a second tine. As an option, the catch may be a rod bent at a midpoint to form the first tine and the second tine, with the first tine being substantially parallel to the second tine. The first tine and the second tine of the catch may be similarly bent into an S-shape in parallel planes. As an option, the bait gap may be an interstice located between the first tine and the second tine.

Optionally, a staple is driven into the top surface of the platform, with the catch being hooked about the staple to secure the staple to the platform. Alternatively, the catch is directly fastened to the top surface of the platform.

In yet another embodiment of the present catch, a bait gap is formed between a first portion and a second portion of the catch, the first portion and the second portion arranged to form a first side of a clamp, the holding arm bar forming a second side of the clamp when the holding arm bar is positioned to restrain the movement of the spring-loaded pivoting kill bar hammer and a portion of the holding arm bar is located beneath the bait gap. The bait is positioned to span the bait gap and is supported by the first portion and the second portion, with the bait clamped between the first side of the clamp and the second side of the clamp to prevent travel of the holding arm bar through the bait gap.

BRIEF DESCRIPTION OF THE SEVERAL VIEWS OF THE DRAWINGS

FIGS. 1A-B are perspective views of two embodiments of the present catch, shown separately from the animal trap;

FIG. 2A is a partial exploded perspective view of a standard animal trap with the standard catch removed and the catch of FIG. 1A in position for attachment to the platform;

FIG. 2B is a partial exploded perspective view of the modified animal trap with the present catch attached and a piece of bait in position for insertion between the catch and the holding arm bar;

FIG. 3 is a magnified perspective view of the embodiment of FIG. 2B, showing the holding arm bar between and directly beneath the bait gap of the catch;

FIG. 4 is a perspective view of the modified animal trap with the bait clamped between the holding arm bar and the tines of the catch;

FIG. 5 is a magnified perspective view of the embodiment of FIG. 4, more clearly showing the clamping relationship of FIG. 4; and FIGS. 6A-B are side and top plan views, respectively, showing the positioning of the bait between the holding arm bar and the catch, as well as the position of the holding arm bar relative to the bait gap.

LISTING OF REFERENCE NUMERALS OF FIRST-PREFERRED EMBODIMENT catch 10
animal trap 11
bait gap 12
first tine 14
second tine 16
first bend 18
second bend 20
third bend 22
platform 24
top surface 26
holding arm bar 28
proximal end 30
distal end 32
first section 34
third section 36
second section 38
pivoting kill bar hammer 40
hammer spring 42
first staple 44
second staple 46
third staple 47
fourth staple 48
rod 50 notch 52
cable tie 54
bait 100
spread 102

DESCRIPTION OF THE PREFERRED EMBODIMENTS

The detailed descriptions set forth below in connection with the appended drawings are intended as a description of embodiments, and is not intended to represent the only forms in which the present securement system may be constructed and/or utilized. The descriptions set forth the structure and the sequence of steps for constructing and operating the securement system in connection with the illustrated embodiments. It is to be understood, however, that the same or equivalent structures and steps may be accomplished by different embodiments that are also intended to be encompassed within the spirit and scope of the invention.

Referring to the example embodiment illustrated in FIGS. 1A-B, two versions of an improved catch (10) compatible with a standard spring-loaded arm bar mouse trap are illustrated. The example embodiment of the catch (10) shown in FIG. 1A is manufactured by bending a metal rod to create a double S shape when viewed in profile. Standard rod or wire bending machines may be used to bend the rod as indicated. Generally, the rod is bent at the midpoint to create bend (22) and two parallel tines, first tine (14) and second tine (16). Both tine of the rod are further bent to create a first bend (18) and a second bend (20), creating the S-shaped profile. Due to the first tine (14) being preferably, but not necessarily, parallel to the second tine (16) of the bent rod, a bait gap (12) is created between the first tine (14) and the second tine (16). The catch (10) is configured to support bait spanning the bait gap (12) between the first tine (14) and the second tine (16), as will be described in greater detail below.

Although the example embodiment illustrated in FIG. 1A illustrates a catch created by bending a rod or wire, the catch (10) can be made with a variety of materials and in a variety of designs, so long as the catch (10) has the ability to restrain movement of the holding arm bar (28) due to bait spanning a bait gap (12) to prevent the holding arm bar (28) from passing through or exiting the bait gap (12) by the bait physically blocking the holding arm bar (28). For example, instead of a bent rod design, the catch can be created by stamping out a rectangular metal sheet and notching one end to create a bait gap, with a first portion of the sheet on one side of the bait gap and a second portion of the sheet on the opposing side of the bait gap. The rectangular sheet can be bent to an S-shape, L-shape, or any other shape appropriate for sandwiching bait between the bait gap and the holding rod to trap the holding rod on one side of the bait gap.

FIG. 1B illustrates an alternate catch (10) design. In this version, the catch (10) is made by stamping, machining, or molding a plate with a bait gap (12) formed at one end. The plate is bent into an S-shape defined by a first bend (18) and a second bend (20). The bait gap (12) is formed on one end of the plate, with a first tine (14) and a second tine (16) on either side of the bait gap (12). Notches (52) may be formed on the plate before and after the second bend (20) for locating a cable tie (54), wire, or other means to secure the catch (10) to the fourth staple (48).

Referring now to FIGS. 2A-B and 3, the catch (10) is shown integrated with a standard spring-loaded trap in which the standard catch (not shown) has been removed. FIG. 2A is a partially exploded view of the present catch (10) in position for attachment to the animal trap (11). The animal trap (11) has a wood platform (24), although other materials may be used, with a top surface (26) having a first section (34), a second section (38), and a third section (36). The sections (34, 36, 38) are not precisely delineated, but instead, represent three general areas of the top surface (26) upon which various parts of the trap may be positioned. In one example, the first section (34) may be generally located at one end of the platform (26), with the second section (38) located generally at the opposite end. The third section (36) is located between the second section (38) and the third section (36), generally at the midpoint.

A first staple (44) is located within the first section, with the holding arm bar (28) attached to the first staple (44) by a loop on the proximal end (30) to create a pivoting attachment. Of course, because the first staple (44) is U-shaped with the proximal end (30) looped about it, the holding arm bar (28) is permitting to pivot and move about the first staple (44) in multiple directions. The pivoting kill bar hammer (40) is generally made from a single wire bent into a rectangular shape, with one side of the rectangle held, much like an axle, by a second staple (46) and a third staple (47) pinned to the third section (36) of the top surface (26). One or more springs (42) biases the rotation of the pivoting kill bar hammer (40) towards the second section (38) of the top surface (26) with enough force and impulse to capture a rodent between the pivoting kill bar hammer (40) and the second section (38). A fourth staple (48) previously held the standard catch to the top surface, but may be repurposed to hold the improved catch (10).

As shown in FIGS. 2B and 3, the catch (10) is hooked about the fourth staple (48) by the second bend (20) in the catch (10). However, the catch (10) need not be hooked to a staple. The catch (10) could be fastened to the top surface (26) or any anchor point on the trap (11). The catch (10) could be fastened to the top surface by mechanical fastener, other fastening means, or a portion of the catch (10) may be directly driven into the wood of the platform (24). For example, one or more teeth may be punched out of the rectangular catch plate, such that the teeth may be driven into the platform. In another example, a portion of the wire in the bent wire design may be driven into the platform. As seen in FIGS. 2B and 3, a cable tie (54) may be wrapped about the catch (10) and the fourth staple (48) to secure the bent wire catch (10) to the platform (24), although the cable tie (54) is not required.

Also shown in FIGS. 2B and 3, the distal end (32) of the holding arm bar (28) is shown positioned below the bait gap (12). In this example, the distal end (32) is inserted through the slot-like bait gap (12) created between the first tine (14) and the second tine (16). Bait (100) is shown in position to be inserted between the distal end (32) and the pair of tines (14, 16). As with standard spring-loaded traps, the pivoting kill bar hammer (40) is rotated from the second section (38) and towards the first section (34) against the force of the springs (42). As the pivoting kill bar hammer (40) is manually held towards the first section (34), the holding arm bar (40) is rotated over the pivoting kill bar hammer (40) such that the proximal end (30) of the holding arm bar (28) touches the pivoting kill bar hammer (40) to arrest its movement. Then, the distal end (32) of the holding arm bar (28) is positioned below the plane of the tines (14, 16) and between them. If released at this point, the spring force acting on the pivoting kill bar hammer (40) will cause the distal end (32) to retract from between the tines (14, 16), swing back, and release the pivoting kill bar hammer (40) so that it strikes the second section (38) of the top surface (26). Thus, to prevent retraction of the distal end (32), a piece of bait is placed between the tines (14, 16) and the distal end (32), with the bait (100) spanning the bait gap (12) between the tines (14, 16).

With the bait (100) in position spanning the tines (14, 16), the bait (100) blocks retraction of the distal end (32). Thus, when the bait is inserted between the tines (14, 16) and the distal end (32), the bait (100) becomes part of the catch mechanism, the bait (100) being the essential component of the catch (10) which holds the distal end (32) or other portion of the holding arm bar (28). In this example, the catch (10) has an S-shape to create secure clamping surfaces on the underside of the tines (14, 16), so that the distal end (32) pushes the bait (100) into the underside of the tines (14, 16), creating a clamping action to hold the bait (100) in place.

In this example, the bait (100) is shown as a cracker or chip. However, the bait (100) can be wide variety of edibles or materials which attract rodents and cause them to interact with the bait (100). Edible forms of bait may include tortilla chips, potato chips, potato flake chips, pretzels, dried meats, fruit, crackers, or the like, and may also be covered in peanut butter or other enticing spread (102). The bait material must be minimally or sufficiently strong to span the bait gap (12) and prevent undesired retraction of the distal end (32) by blocking the distal end (32) in the area between the tines (14, 16).

Looking now at FIGS. 4, 5, and 6A-B, magnified views of the bait (100) sandwiched between the distal end (32) and the tines (14, 16) is shown. In particular, FIG. 6A is a side view that shows the distal end (32) of the holding arm bar (28) being held beneath the plane of the tines (14, 16) by virtue of the bait (100) preventing the upward movement of the distal end (32). As discussed previously, the distal end (32) of the holding arm bar (28) experiences an upward force (a counter clockwise torque as view from FIG. 6A) pushing the distal end (32) into the bait (100), clamping the bait (100) between the tines (14, 16) and the distal end (32). FIG. 6B is a top view of the embodiment of FIG. 6A, with the bait (100) in position to be inserted. The distal end (32) is not only beneath the plane of the tines (14, 16), it is also positioned between the tines (14, 16) and within or under the bait gap (12).

In the illustrated configuration, if the bait (100) were to be removed, dislodged from a secure position, or broken, the distal end (32) would be released, permitting the holding arm bar (28) to swing free of the pivoting kill bar hammer (40), allowing the pivoting kill bar hammer (40) to snap back to the second section (38) to kill or trap the rodent. The rodent may dislodge the bait (100) in numerous ways. For example, because the bait (100) is elevated above the top surface (26), the rodent may choose to push down on the cantilevered end of the bait (100), illustrated by arrow $F_1$. The bait (100) would pivot clockwise on the distal end (32), pushing the distal end (32) downwards and prying the bait (100) from under the tines (14, 16) until the distal end (32) is released and permitted to pass between the tines (14, 16). In another example, the rodent may choose to pull the bait (100) from between the distal end (32) and the tines (14, 16), illustrated by arrow $F_2$, to again release the distal end (32). In yet another example, the rodent may dislodge the bait (100) by directly breaking the bait (100) or eating the bait (100) causing it to lose structural integrity, thus releasing the distal end (32).

Because the bait (100) acts as part of the catch (10) and serves to restrain the holding arm bar (28), the rodent cannot remove the bait (100) without springing the trap. Furthermore, again because the bait (100) holds the distal end (32) the rodent cannot easily disturb the bait (100) without releasing the distal end (32) to spring the trap. Looking once more at FIG. 6A, it can be seen that just one edge of the bait (100) is clamped between the distal end (32) and the tines (14, 16), leaving a large portion of the bait (100) cantilevered, thus providing a long lever arm, such that a disturbing force applied to the cantilevered end of the bait (100) will be magnified at the catch (10) causing the bait (100) to easily pull free or break away from the catch (10), although the bait (100) may be positioned differently with similar or the same result.

While particular forms of the present securement system have been illustrated and described, it will also be apparent to those skilled in the art that various modifications can be made without departing from the spirit and scope of the design. Accordingly, it is not intended that the invention be limited except by the claims.

What is claimed is:

1. An animal trap utilizing bait, the animal trap comprising:
    a platform having a top surface with a first section, a second section, and a third section located between the first section and the second section;
    a holding arm bar with a proximal end and a distal end, the holding arm bar attached through a pivot to the first section of the platform by the proximal end;
    a pivoting kill bar hammer attached to the third section of the platform and being biased towards the second section; and
    a catch with a bait gap and being positioned on the top surface;
    wherein the pivoting kill bar hammer is pivoted towards the first section against bias with the distal end of the holding arm bar being aligned with the bait gap and the proximal end restraining the pivoting kill bar hammer;
    wherein the bait is positioned to span the bait gap and lie between the catch and the distal end of the holding arm bar to prevent travel of the distal end through the bait gap, such that the pivoting kill bar hammer is held towards the first section by the holding arm bar, the distal end being released upon dislodging of the bait from the bait gap to permit the pivoting kill bar hammer to return towards the second end, wherein the catch comprises a first portion and a second portion with the bait gap formed there-between and wherein said first portion is a first tine and second portion is a second tine.

2. The animal trap of claim 1 wherein the catch is a rod bent at a midpoint to form the first tine and the second tine.

3. The animal trap of claim 2 wherein the first tine and the second tine of the catch are similarly bent into an S-shape in parallel planes.

4. The animal trap of claim 3 wherein a staple is driven into the top surface of the platform, the catch being hooked about the staple to secure the staple to the platform.

5. The animal trap of claim 3 wherein the bait gap is an interstice located between the first tine and the second tine.

6. The animal trap of claim 1 wherein the catch is directly fastened to the top surface of the platform.

7. The animal trap of claim 1 wherein the catch is a plate which is bent at a first bend and a second bend and with the bait gap formed at one end of the plate.

8. A catch for an animal trap, the animal trap having a platform, with a spring-loaded pivoting kill bar hammer, and a holding arm bar for selectively restraining the movement of the spring-loaded pivoting kill bar hammer, the catch comprising:
    a bait gap formed between a first portion and a second portion, the first portion and the second portion arranged to form a first side of a clamp, the holding arm bar forming a second side of the clamp when the holding arm bar is positioned to restrain the movement of the spring-loaded pivoting kill bar hammer and a portion of the holding arm bar is located beneath the bait gap;

wherein the bait is positioned to span the bait gap and being supported by the first portion and the second portion, the bait being clamped between the first side of the clamp and the second side of the clamp preventing travel of the holding arm bar through the bait gap, wherein the first portion is a first tine and the second portion is a second tine.

9. The animal trap of claim 8 wherein the catch is a rod bent at a midpoint to form the first tine and the second tine, the first tine being substantially parallel to the second tine.

10. The catch of claim 9 wherein the first tine and the second tine of the catch are similarly bent into an S-shape in parallel planes.

11. The catch of claim 10 wherein a staple is driven into a top surface of the platform, the catch being hooked about the staple to secure the staple to the platform.

12. The catch of claim 10 wherein the bait gap is an interstice located between the first tine and the second tine.

13. The catch of claim 8 wherein the catch is configured to be directly fastened to a top surface of the platform.

14. The catch of claim 8 wherein the catch is configured to be connected to a staple, the staple being located on a top surface of the platform.

\* \* \* \* \*